(12) United States Patent
Paquin

(10) Patent No.: US 10,518,287 B1
(45) Date of Patent: Dec. 31, 2019

(54) LAWN SPRINKLER HEAD CONVERSION SLEEVE

(71) Applicant: Theodore James Paquin, Iron Mountian, MI (US)

(72) Inventor: Theodore James Paquin, Iron Mountian, MI (US)

(73) Assignee: Theodore James Paquin, Iron Mountain, MI (US)

( * ) Notice: Subject to any disclaimer, the term of this patent is extended or adjusted under 35 U.S.C. 154(b) by 0 days.

(21) Appl. No.: 16/230,016

(22) Filed: Dec. 21, 2018

Related U.S. Application Data

(60) Provisional application No. 62/763,764, filed on Jul. 2, 2018.

(51) Int. Cl.
  *B05B 15/65* (2018.01)
  *A01G 25/06* (2006.01)

(52) U.S. Cl.
  CPC .............. *B05B 15/65* (2018.02); *A01G 25/06* (2013.01)

(58) Field of Classification Search
  CPC .................................. B05B 15/65; A01G 25/06
  See application file for complete search history.

(56) References Cited

U.S. PATENT DOCUMENTS

| | | | | |
|---|---|---|---|---|
| 1,833,040 A * | 11/1931 | Rader | ..................... | B05B 15/74 285/302 |
| 2,963,264 A * | 12/1960 | Hruby, Jr. | ............. | F16L 55/027 251/216 |
| 3,083,914 A * | 4/1963 | Smith | ................... | B05B 15/658 239/203 |
| 4,616,780 A * | 10/1986 | Abbott | .................... | B05B 15/74 239/113 |
| 5,109,929 A * | 5/1992 | Spears | .................... | F16L 47/24 169/16 |
| 5,695,122 A * | 12/1997 | Messinger | ............ | B05B 3/0422 239/240 |
| 6,299,075 B1 * | 10/2001 | Koller | ..................... | B05B 15/70 239/106 |
| 6,488,218 B1 * | 12/2002 | Townsend | ............... | B05B 15/74 239/205 |
| 7,644,870 B2 * | 1/2010 | Alexander | ............. | B05B 15/70 239/1 |
| 8,430,339 B2 * | 4/2013 | Stewart | ................... | B05B 15/70 239/203 |
| 9,517,373 B2 * | 12/2016 | Rendon | ................... | A62C 35/68 |
| 2005/0194464 A1 * | 9/2005 | Bruninga | ................ | B05B 15/70 239/200 |

* cited by examiner

*Primary Examiner* — Joshua T Kennedy

(57) ABSTRACT

A sprinkler head conversion sleeve/base member made of durable plastic, comprised of a cylindrical sleeve having an opening at the upper end with an external thread for attachment to a gear driven sprinkler head. The lower end of the sleeve having an external thread for attachment to the internal threads of an in-ground sprinkler housing. The open bottom of the sleeve receives water from the lower chamber of the existing sprinkler housing with no direct connect to a pressurized water system, water enters from either the bottom or the side orifice with no additional plumbing. The sleeve also supports internal protrusions which facilitate the mechanical operation of a gear driven sprinkler head used in conjunction with the sleeve.

1 Claim, 2 Drawing Sheets

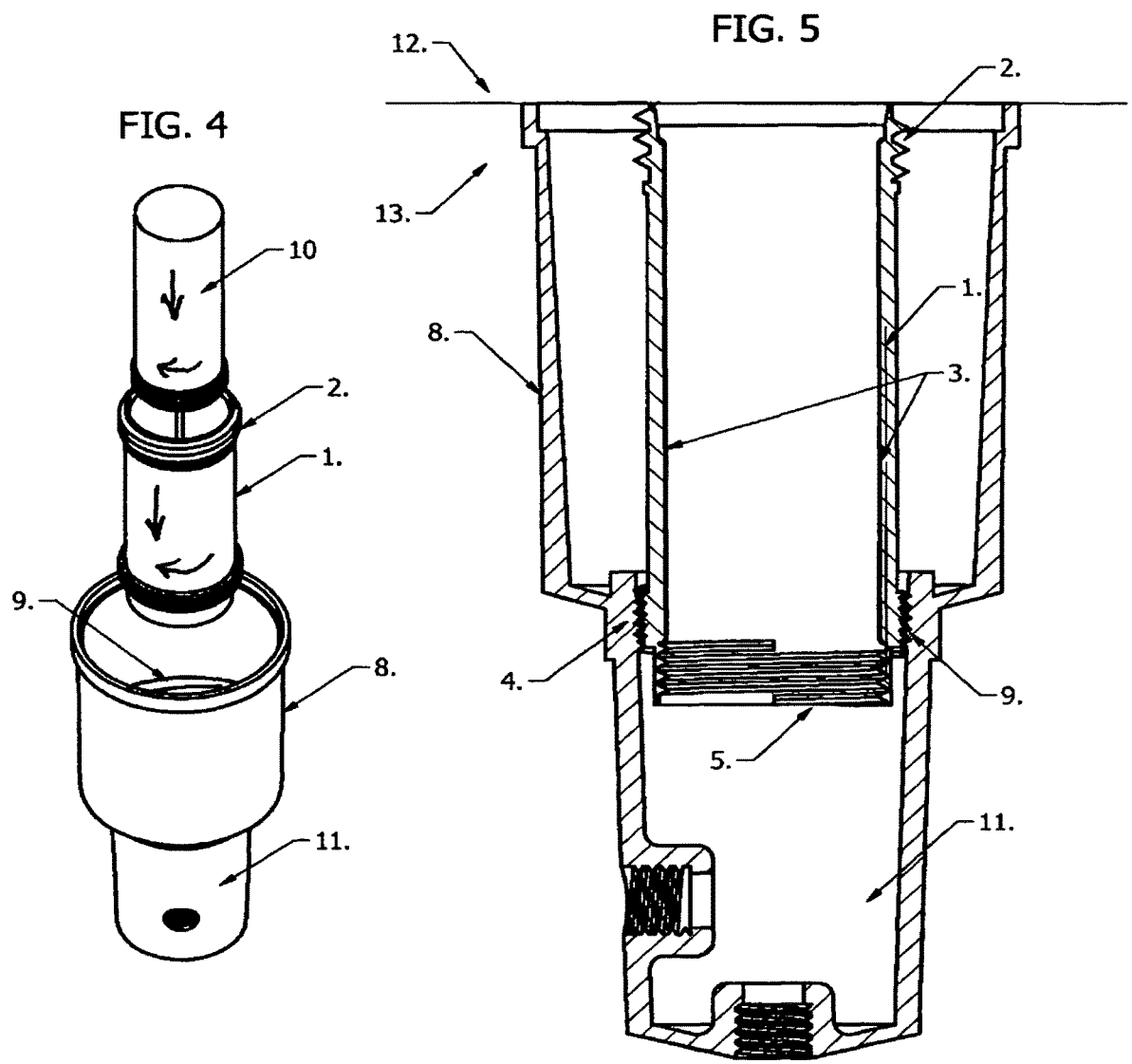

LAWN SPRINKLER HEAD CONVERSION SLEEVE

CROSS-REFERENCE TO RELATED APPLICATIONS

Previous provisional application filed on Jul. 2, 2018
Application number: 62/763,764 Submitted by Theodore J. Paquin

FEDERALLY SPONSORED RESEARCH DEVELOPMENT (Not Applicable)

SEQUENCE LISTING REFERENCE (Not Applicable)

BACKGROUND

For purposes of irrigating lawns there are currently two types of sprinkler heads used. One is the old-generation impact sprinkler head and the other is the more current gear-driven sprinkler head. Impact type sprinkler heads are subject to frequent malfunction because of the exposed mechanisms. As a result they are subject to dirt, grime, and grass build-up which can inhibit the operation of the impulse mechanisms. More effectively, however, experience has shown that a gear-driven sprinkler system is more efficient than an impact sprinkler system. Gear-driven sprinkler units are sealed and not subject to the same malfunctions as impact sprinklers and are basically trouble free.

Prior art in similar classifications refer to multiple moving parts such that they spin, telescope, sprinkle, ratchet, slide, expand, pop up, pull down, or mesh with any number of other moving parts. Unlike the prior art, this conversion sleeve has no moving parts and can be directly attached to an existing in-ground impact sprinkler housing (8).

Disclosed is a system for converting impact sprinkler systems to gear-driven systems within an existing in-ground impact sprinkler housing. This system comprises a conversion sleeve for changing impact sprinkler heads to gear-driven rotary heads without digging up the existing housings.

SUMMARY OF INVENTION

The sprinkler head conversion sleeve provides a conversion arrangement that enables the sprinkler heads of impact sprinklers to be supplanted with a sprinkler heads of the gear-driven type for which the housing was not specifically designed. The sleeve is designed so that when removing an impact sprinkler head from its housing, the sleeve can then be inserted and twisted directly into the impact sprinkler housing allowing a gear-driven sprinkler head to be screwed directly into the sleeve, changing the assembly to a gear-driven.

The body of the sleeve comprises a single cylinder of durable plastic having external threads at both upper and lower ends of the body, threads ranging from a single thread to multiple threads. The sleeve has internal threads at a bottom end of the sleeve and protrusions on the inside of the cylinder wall. The sleeve eliminates having to dig up the underground housing to replace a defective sprinkler head by simply installing a gear-driven assembly. This procedure is accomplished with no direct plumbing connection to a pressurized water source. The gear-driven head is raised during typical operation as a result of water pressure from the lower chamber of the sprinkler housing. Said sleeve and other features of the invention will become apparent and better understood when referencing the following drawings, descriptions, and claims. The installation of this sleeve into an existing underground system is fast, efficient, and economical.

BRIEF DESCRIPTION OF DRAWINGS

FIG. 4 shows an exploded view of the sleeve in concert with a gear-driven head and an existing sprinkler housing.

FIG. 5 shows a cross-sectional view of the sleeve positioned in an existing sprinkler housing.

DETAILED DESCRIPTION OF INVENTION

The purpose of this invention is such that it allows a person to remove old generation impact or impulse type sprinkler head from its housing in an in-ground sprinkler system and insert the conversion sleeve which allows a gear-driven sprinkler head to be threaded into it, changing the system from impulse/impact to gear-driven. The conversion sleeve can be inserted into an existing in-ground sprinkler housing which has been vacated by the removal of an impact sprinkler head and subsequently support gear driven sprinkler heads, which changes the entire complexity of the lawn sprinkling system.

The lawn sprinkler head conversion sleeve (1) is a single, hollow cylindrical sleeve manufactured and machined of durable plastic material, such as ABS or polyvinyl chloride (PVC). The sleeve has an upper portion and a lower portion.

Figure 1:
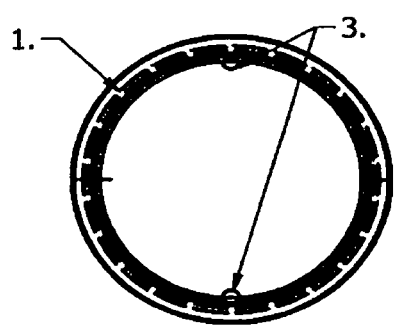
FIG. 1 shows a cross-sectional view through the sleeve body.
Figure 2:
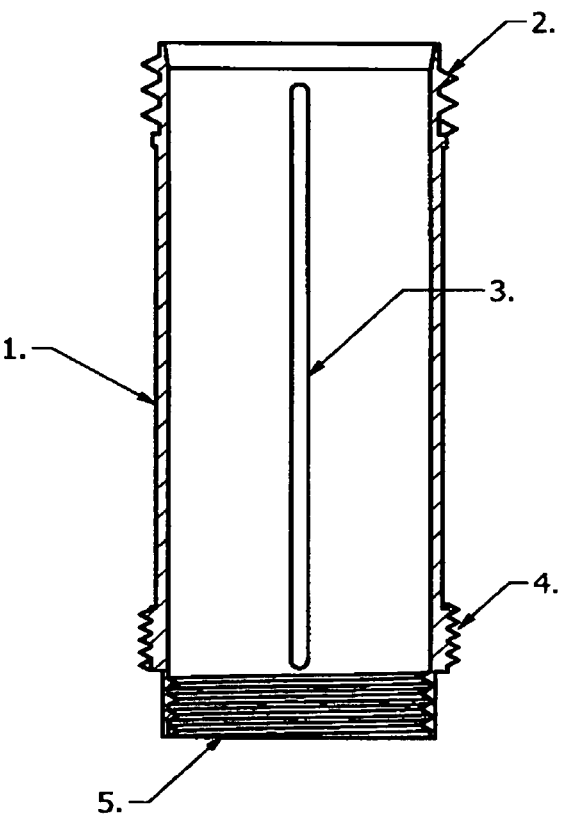
FIG. 2 shows an orthographic projection of the sleeve in cross-section.
Figure 3:
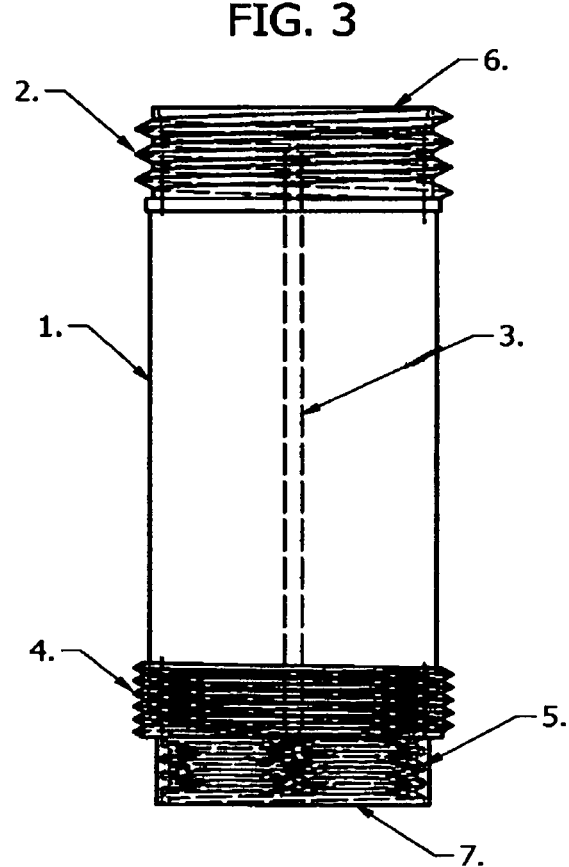
FIG. 3 shows a front view of the sleeve.

The upper portion comprising a plurality of protrusions on an inner surface of the upper portion of the sleeve running the length of the upper portion (FIGS. 1-3). The protrusions may be v-shaped and facilitate the securing the gear driven device for normal gearhead operation.

The upper portion also has top (2) and bottom (4) external threads (FIG. 3) to accommodate the functionality of the sleeve. The top external thread (2) provides an attachment point for a gear-driven sprinkler head (10). The bottom external thread (4) allows the sleeve to attach to the internal threads (9) of the in-ground housing (8). The top and bottom threads are separated by a central body portion having a non-threaded external surface.

The sleeve further comprises a lower portion having a non-threaded external surface and an internal thread (5) adjacent a bottom end opening of the sleeve which is configured for the attachment of a gear driven sprinkler head. The internal thread (5) can be plumbed to replace the entire housing in the event of a housing damaged beyond repair. The bottom end opening (7) will allow pressurized water to egress into the sleeve (1) from a lower chamber (11) of an in-ground sprinkler housing (8; FIGS. 4-5) with no direct connection to the pressurized line.

The three-step process to implement this invention is as follows:

1. Remove the impact sprinkler head from housing (8) using a lifting tool commonly used to remove impact sprinkler heads.
2. Insert and twist the conversion sleeve (1) into the in-ground housing's internal threads (5).
3. Insert and twist a gear-driven head (10) into the internal threads of the conversion sleeve (1) such that it is even with a lawn surface (FIG. 5).

I claim:

1. A Lawn sprinkler head conversion sleeve configured for supplanting impact sprinkler heads to gear-driven sprinkler heads within an in-ground sprinkler housing, said sleeve comprising:
   a unitary, one-piece hollow body made of a durable plastic material and having openings at an top end, configured to accept a gear-driven sprinkler head, and a bottom end, configured to communicate with a sprinkler line;
   said hollow body having an upper portion and a lower portion;
   said upper portion comprising
      first external threads located on an upper end of said upper portion and adjacent said top end opening;
      second external threads located on a lower end of said upper portion configured engage an in-ground sprinkler housing;
      said first and second external threads being separated by a central body portion having a non-threaded external surface; and
      protrusions on an inner surface of said upper portion extending from said upper end to said lower end;
   said lower portion extending from the upper portion and comprising
      a non-threaded external surface; and
      an internal thread adjacent said bottom end opening of said hollow body configured for the attachment of a gear driven sprinkler head.

* * * * *